United States Patent
Kohn et al.

(10) Patent No.: US 11,490,114 B1
(45) Date of Patent: Nov. 1, 2022

(54) SHARED MOTION ESTIMATION COST METRICS FOR OVERLAPPING UNITS

(71) Applicant: Ambarella International LP, Santa Clara, CA (US)

(72) Inventors: Leslie D. Kohn, Saratoga, CA (US); Peter Verplaetse, Redwood City, CA (US)

(73) Assignee: Ambarella International LP, Santa Clara, CA (US)

(*) Notice: Subject to any disclaimer, the term of this patent is extended or adjusted under 35 U.S.C. 154(b) by 428 days.

(21) Appl. No.: 14/736,744

(22) Filed: Jun. 11, 2015

(51) Int. Cl.
| | |
|---|---|
| *H04N 19/52* | (2014.01) |
| *H04N 19/53* | (2014.01) |
| *H04N 19/43* | (2014.01) |
| *H04N 19/513* | (2014.01) |
| *H04N 19/436* | (2014.01) |

(52) U.S. Cl.
CPC ........... *H04N 19/521* (2014.11); *H04N 19/43* (2014.11); *H04N 19/436* (2014.11); *H04N 19/53* (2014.11)

(58) Field of Classification Search
USPC ..................................................... 375/240.16
See application file for complete search history.

(56) References Cited

U.S. PATENT DOCUMENTS

| | | | | |
|---|---|---|---|---|
| 2004/0120400 A1* | 6/2004 | Linzer | ................... | H04N 5/145 375/240.16 |
| 2013/0094592 A1* | 4/2013 | Zhou | ................... | H04N 19/433 375/240.25 |

\* cited by examiner

*Primary Examiner* — Mikhail Itskovich
(74) *Attorney, Agent, or Firm* — Christopher P. Maiorana, PC

(57) ABSTRACT

An apparatus having a processor and a circuit is disclosed. The processor may be configured to (i) compare, at a first level of a motion estimation hierarchy, first units of a current picture with a reference picture to generate first metrics, (ii) combine, at the first level, the first metrics to generate second metrics and (iii) refine, at a second level of the hierarchy, the first metrics and the second metrics to generate motion vectors. Multiple metrics may be refined in parallel. The first metrics generally correspond to the first units in an overlapping unit of the current picture. The second metrics generally correspond to a plurality of second units in the overlapping unit. Each second unit may overlap one or more first units. The circuit may be configured to process the overlapping unit based on the motion vectors to generate an output signal.

18 Claims, 7 Drawing Sheets

SHARED MOTION ESTIMATION COST METRICS FOR OVERLAPPING UNITS

FIELD OF THE INVENTION

The present invention relates to motion estimation generally and, more particularly, to shared motion estimation cost metrics for overlapping units.

BACKGROUND OF THE INVENTION

Conventional tree-coded video compression allows encoding of a picture in units of variable size. The picture is divided into a sequence of basic units, known as coding tree units, that are further divided using a K-tree partitioning into variable size coding units. Each coding unit can be further divided into prediction units, thereby extending the decision tree to even higher depths by considering one of several prediction unit configurations.

Depending on content, different coding unit/prediction unit sizes within a coding tree unit will lead to better quality. Therefore, all combinations of coding unit/prediction units are commonly explored to find the tree partitioning that yields the best quality video coding. Exploring all combinations increases a coding complexity by a factor of N*M, where N is a number of levels in the coding tree and M is a number of prediction units. What is lacking is a motion estimation system that can efficiently explore a solution space for all coding unit/prediction unit combinations that are possible with the tree-coded video compression.

It would be desirable to implement shared motion estimation cost metrics for overlapping units.

SUMMARY OF THE INVENTION

The present invention concerns an apparatus having a processor and a circuit. The processor may be configured to (1) compare, at a first level of a motion estimation hierarchy, first units of a current picture with a reference picture to generate first metrics, (ii) combine, at the first level, the first metrics to generate second metrics and (iii) refine, at a second level of the hierarchy, the first metrics and the second metrics to generate motion vectors. Multiple metrics may be refined in parallel. The first metrics generally correspond to the first units in an overlapping unit of the current picture. The second metrics generally correspond to a plurality of second units in the overlapping unit. Each second unit may overlap one or more first units. The circuit may be configured to process the overlapping unit based on the motion vectors to generate an output signal.

The objects, features and advantages of the present invention include providing shared motion estimation cost metrics for overlapping units that may (i) process different unit sizes in parallel in multiple pipelines, (ii) share an initial few stages among the pipelines for cost metric calculations, (iii) perform a coarse motion estimation in the shared stages, (iv) perform an initial motion estimation refinement in the shared stages, (v) perform subsequent motion estimation refinement in the parallel stages, (vi) provide efficient motion estimation at multiple levels of granularity, (vii) provide efficient motion estimation at multiple unit sizes and/or (viii) be implemented as part of a digital camera.

BRIEF DESCRIPTION OF THE DRAWINGS

These and other objects, features and advantages of the present invention will be apparent from the following detailed description and the appended claims and drawings in which:

DETAILED DESCRIPTION OF EMBODIMENTS

Various embodiments of the invention may achieve efficient motion estimation for high performance, high quality processing of overlapping units in pictures and/or video. In various embodiments, a top-level overlapping unit may be partitionable into smaller sizes (e.g., sub-units) to achieve finer levels of motion estimation. The units and/or sub-units may overlap each other in a variety of ways. In various embodiments, the overlap may be based on a tree partitioning of the units into smaller units. In some embodiments, two or more of the units and/or sub-units may have a same size. In various situations, similar-sized units at different levels may spatially aligned to each other.

In terms of video processing, the overlapping units may be coding tree units (e.g., CTU). The coding tree unit processing may be performed according to more recent video compression standards, including but not limited to, a High-Efficiency Video Coding (e.g., HEVC) standard H-265. High quality tree-coded video compression generally utilizes sub-integer motion estimation performed locally at a lowest block (or unit) level. The high-quality video compression may rely on inter-prediction to achieve good compression ratios. Using inter-prediction, prediction samples are generated from interpolation or extrapolation of temporally neighboring samples. Part of the inter-prediction is a motion estimation (e.g., ME). The motion estimation may find a best motion vector for each potential reference picture using simple cost metrics.

Figure 1:
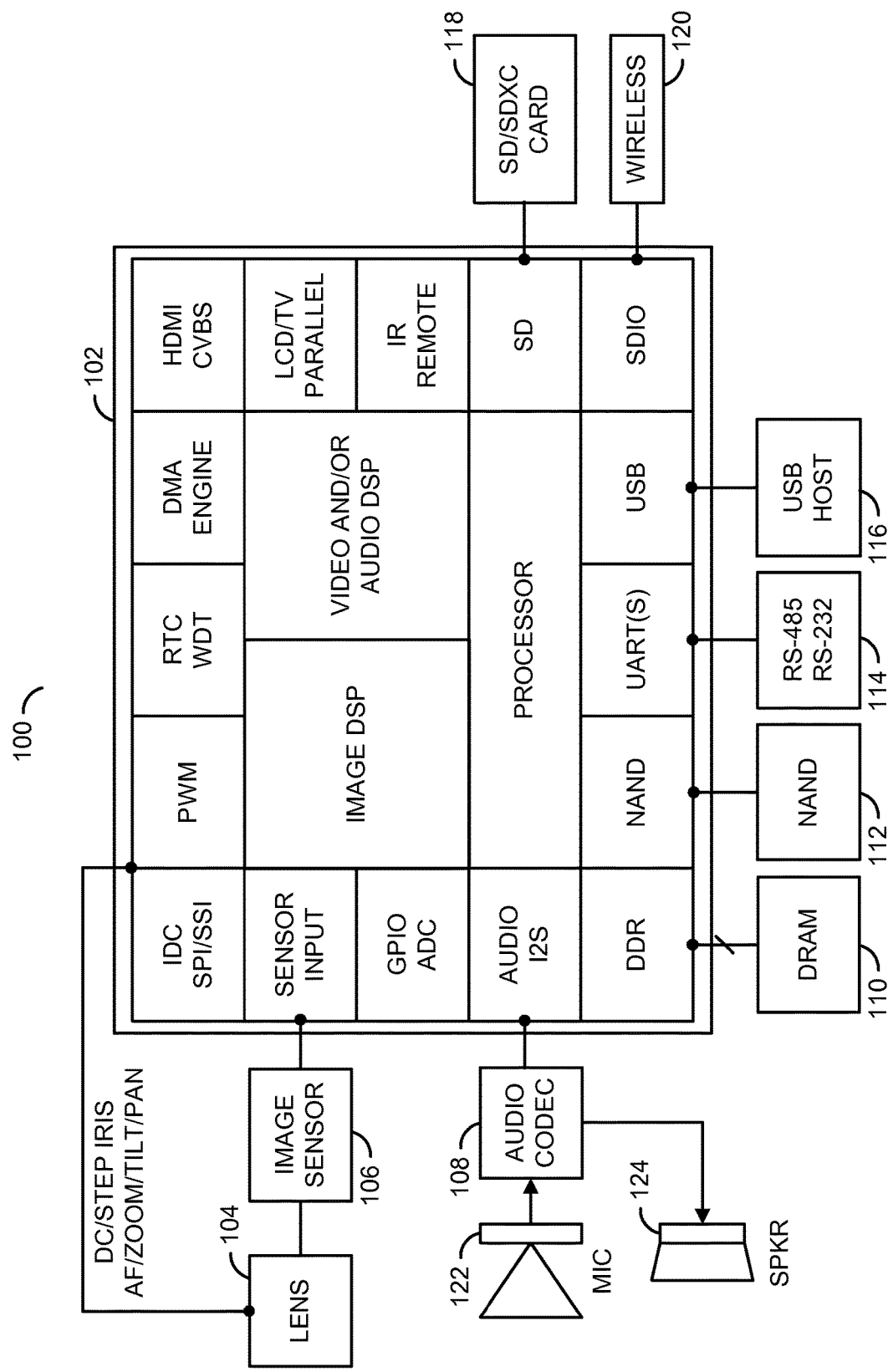
FIG. 1 is a block diagram of a camera system.

Referring to FIG. 1, a block diagram of a camera system 100 is shown illustrating an example implementation of a camera/recorder system (or apparatus). In some embodiments, the camera system 100 may be a digital video camera, a digital still camera or a hybrid digital video/still camera. In an example, the electronics of the camera system 100 may be implemented as one or more integrated circuits. For example, an application specific integrated circuit (e.g., ASIC) or system-on-a-chip (e.g., SOC) may be used to implement a processing portion of the camera system 100. In various embodiments, the camera system 100 may comprise a camera chip (or circuit) 102, a lens assembly 104, an image sensor 106, an audio codec 108, dynamic random access memory (e.g., DRAM) 110, nonvolatile memory (e.g., NAND flash memory, NOR flash memory, etc.) 112, one or more serial interfaces 114, an interface 116 for connecting to or acting as a universal serial bus (e.g., USB) host, an interface for connecting to a removable media 118 (e.g., SD—secure digital media, SDXC—secure digital extended capacity media, etc.), a wireless interface 120 for communicating with a portable user device, a microphone 122 for recording audio, and a speaker 124 for playing audio. In some embodiments, the lens assembly 104 and the image sensor 106 may be part of a separate camera connected to the processing portion of the system 100 (e.g., via a video cable, a high definition media interface (e.g., HDMI) cable, a USB cable, an Ethernet cable, or wireless link).

In various embodiments, the circuit 102 may comprise a number of modules (or circuits) including, but not limited to, a pulse width modulation (e.g., PWM) module, a real time clock and watchdog timer (e.g., RTC/WDT), a direct memory access (e.g., DMA) engine, a high-definition multimedia interface (e.g., HDMI), an LCD/TV/Parallel interface, a general purpose input/output (e.g., GPIO) and an analog-to-digital converter (e.g., ADC) module, an infrared (e.g., IR) remote interface, a secure digital input output (e.g., SDIO) interface module, a secure digital (e.g., SD) card interface, an audio inter-IC sound (e.g., I2S) interface, an image sensor input interface, and a synchronous data communications interface (e.g., IDC SPI/SSI). The circuit 102 may also include an embedded processor (e.g., ARM, etc.), an image digital signal processor (e.g., DSP), and a video and/or audio DSP. In embodiments incorporating the lens assembly 104 and image sensor 106 in the system 100, the circuit 102 may be configured (e.g., programmed) to control the lens assembly 104 and receive image data from the sensor 106. The wireless interface 120 may include support for wireless communication by one or more wireless protocols such as Bluetooth®, ZigBee®, Institute of Electrical and Electronics Engineering (e.g., IEEE) 802.11, IEEE 802.15, IEEE 802.15.1, IEEE 802.15.2, IEEE 802.15.3, IEEE 802.15.4, IEEE 802.15.5, and/or IEEE 802.20. The circuit 102 may also include support for communicating using one or more of the universal serial bus protocols (e.g., USB 1.0, 2.0, 3.0, etc.). The circuit 102 may also be configured to be powered via the USB connection. However, other communication and/or power interfaces may be implemented accordingly to meet the design criteria of a particular implementation.

In various embodiments, programming code (e.g., executable instructions for controlling various processors and encoders of the circuit 102) implementing shared motion estimation cost metrics for overlapping unit processing may be stored in one or more of the memories 110 and 112. When executed by the circuit 102, the programming code generally causes one or more processors in the circuit 102 to compare multiple small units of a current picture with a reference picture to generate multiple initial cost metrics at an initial level of a motion estimation hierarchy. The initial cost metrics generally correspond to the small units in the overlapping unit. In various embodiments, the overlapping unit may be a coding tree unit (e.g., CTU) of video.

The programming code may further cause the circuit 102 to combine the initial cost metrics to generate multiple combined cost metrics at the initial level of the motion estimation hierarchy. The programming code may also cause the circuit 102 to refine the initial cost metrics and the combined cost metrics to generate motion vectors at a higher level of the motion estimation hierarchy. Two or more of the cost metrics may be refined in parallel to each other. The combined cost metrics generally correspond to multiple higher units in the overlapping unit. Each higher unit may overlap one of more of the small units. The programming code may also cause other circuitry (e.g., an entropy encoder) in the circuit 102 to process (e.g., entropy encode) the overlapping unit based on the motion vectors to generate an output signal (e.g., compressed video signal). The output signal may be presented to the SD/SDXC card 118, and/or the wireless interface 120, and/or the USB interface 116.

The motion estimation information generated by the circuit 102 may be used as input data to a variety of circuits and/or software applications executing in hardware. For example, the motion estimation information may be received by one or more motion compensations, compressions, computer vision and/or optical flows (or processes). The computer vision and/or optical flows may use the motion estimations for motion detection, motion tracking, identification and/or image segmentation. Other functions that consume the motion estimations may be implemented to meet the design criteria of a particular application.

Figure 2:
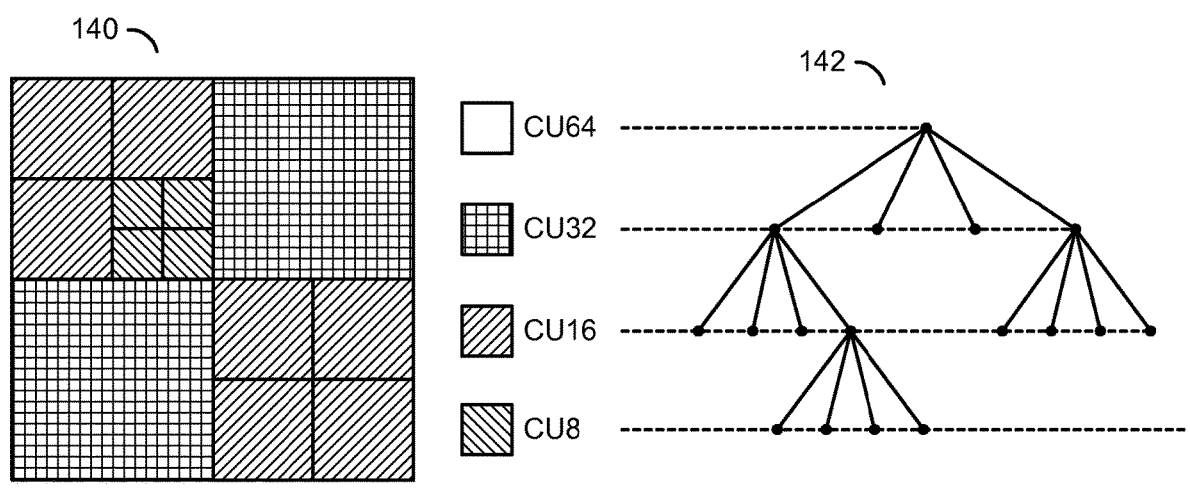
FIG. 2 is a block diagram of an overlapping unit partitioned into smaller units with quad-partitioning.

Referring to FIG. 2, a block diagram of an example overlapping unit partitioned into smaller units with quad-partitioning is shown. In various embodiments, tree-coded video compression generally involves encoding the images in units of variable size. A coding unit (e.g., overlapping unit) 140 with a fixed size of 16×16, 32×32 or 64×64 pixels (or samples) for the entire sequence may be recursively partitioned 142 into smaller coding units (e.g., CU). Therefore, the coding units may be of variable size, and range from a maximum size of 64×64 (e.g., CU64) pixels (or samples) down to a smallest size of 8×8 (e.g., CU8) pixels (or samples). The coding tree unit and the coding unit sizes shown are generally specified in the H.265 High-Efficiency Video Coding standard (e.g., International Telecommunication Union-Telecommunications Standard H.265). Other sizes may be implemented to meet the design criteria of a particular application.

Different video content may result in different choices for the binary tree partitioning of the coding tree units into the coding units. The decisions are generally made in hardware, or software and/or firmware executing in a processor, and best results may be achieved by exploring all possible partitions in parallel and comparing the cost metrics. The cost metrics may include, but are not limited to sum of absolute transformed differences (e.g., SATD) scores and/or sum of absolute differences (e.g., SAD) scores.

Figure 3:
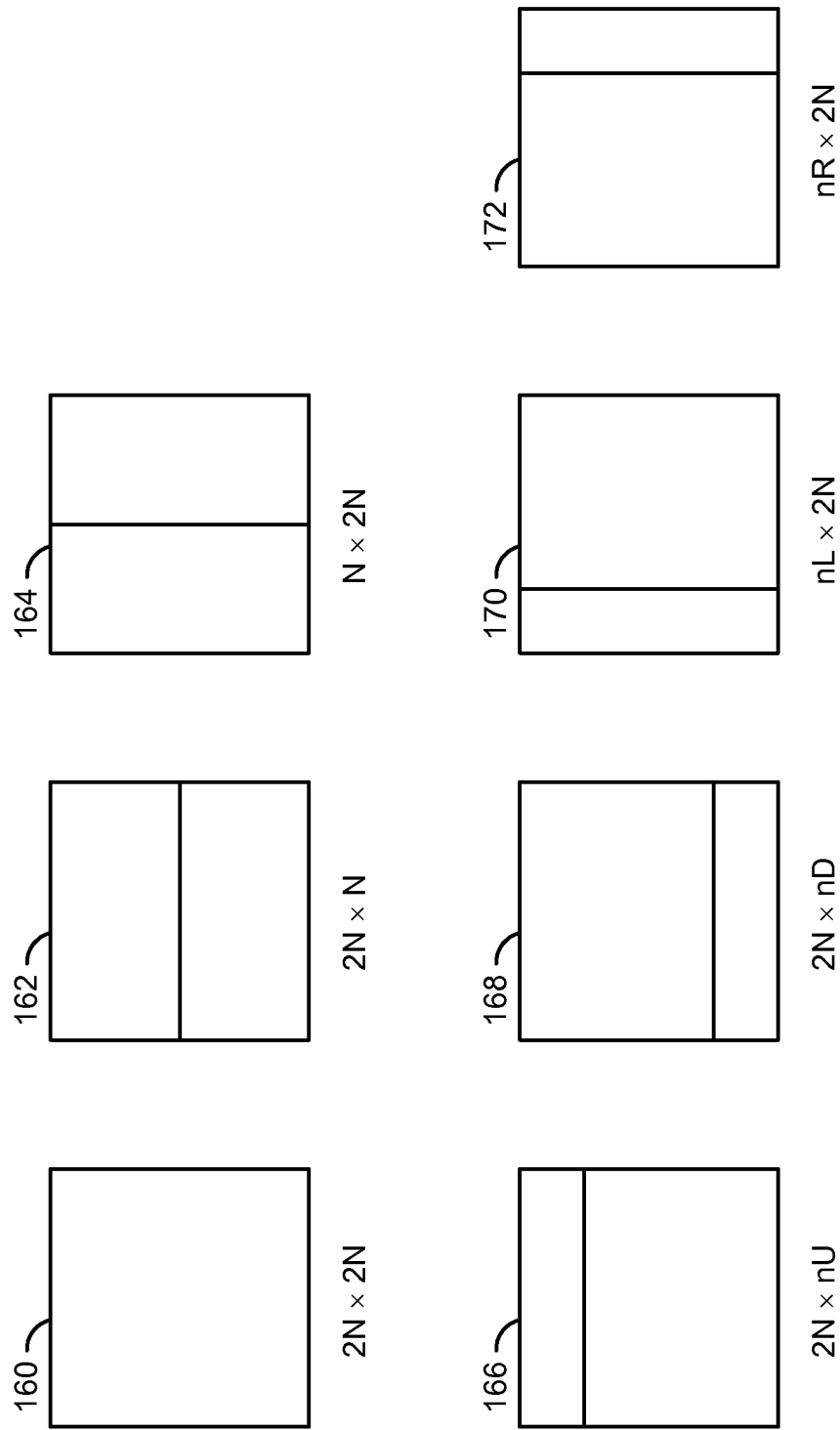
FIG. 3 is a block diagram of different prediction unit configurations.

Referring to FIG. 3, a block diagram of different prediction unit configurations is shown. The various prediction units (e.g., PU) may be specified by the HEVC standard. The tree-coded video compression may explore of all N*M coding unit/prediction unit combinations to obtain a best video quality coding, where N is a number of levels in the coding tree and M is a number of prediction units. For the HEVC video coding standard, a coding tree unit with a fixed size up to 64×64 samples may be divided using quad-partitioning (e.g., K=4) into coding units with size of 8×8 samples, 16×16 samples, 32×32 samples or 64×64 samples (e.g., N=4). For most coding unit sizes up to several (e.g., M=7) prediction unit configurations 160-172 may exist. In particular, the prediction unit configurations may include 2N×2N (160), 2N×N (162), N×2N (164), 2N×nU (166), 2N×nD (168), nL×2N (170) and nR×2N (172) prediction units, where nU may divide the unit into an upper ¼ rectangle and lower ¾ rectangle, nD may divide the unit into a lower (down) ¼ rectangle and upper ¾ rectangle, nL may divide the unit into a left ¼ rectangle and right ¾ rectangle, and nR may divide the unit into a right ¼ rectangle and a left ¾ rectangle. For 8×8 samples, only the first three prediction unit configurations (160-164) may be allowed. Therefore, 24 combinations total may exist for a coding unit/prediction unit partition tree.

Applying motion estimation separately to all coding unit/prediction unit sizes is commonly expensive in terms of processing power and/or processing area. A considerable amount of hardware may be implemented to process all coding unit/prediction units in parallel. Alternatively, a considerable amount of time may be used to process all coding unit/prediction units in a time-interleaved fashion using the same hardware. In some common designs, a single search may be performed for a largest coding unit/prediction unit size. A resulting motion vector may be used for all coding unit/prediction unit sizes. The single search may be efficient, but may result in poor coding quality because the benefit of using smaller partition sizes generally disappears.

In various embodiments of the circuit 102, high quality motion vectors may be determined for the different coding unit/prediction unit sizes via a merged approach. At an initial search step (e.g., a step P0), search operations for all coding units/prediction units may be centered at a same starting point (e.g., an initial integer-pel coarse motion vector). Therefore, the cost metric (e.g., SAD score) for each search position and for each coding unit/prediction unit may be calculated in a shared hierarchical fashion. The cost metrics may be initially calculated for a smallest common block size among all coding unit/prediction unit sizes. Next, the cost metrics for the larger coding unit/prediction unit sizes may be calculated by summing the cost metrics for the smaller parts (e.g., the smallest common block size). By summing the cost metrics in a motion estimation hierarchical fashion, the cost metric calculations for all coding unit/prediction units sizes may be computationally similar to a single global cost metric calculation.

The cost metric calculations at the initial search step P0 may be performed in a shared fashion. Thereafter, motion vector differences (e.g., MVD), final score calculations and winner coding unit/prediction unit selections may be performed separately. A search space should have a sufficiently large enough search range at the initial search step P0 to increase a likelihood that the best search positions for each coding unit/prediction unit may be captured despite the use of a common initial coarse motion vector. The initial coarse motion vector may be computed using existing techniques, such as a hierarchical search.

Subsequent fractional (or sub-pel) refinement search steps (e.g., a step P1, a step P2, etc.) may be performed separately for each coding unit/prediction unit size. Because each coding unit/prediction unit has a different winning motion vector (with a respective winning cost metric), the cost metric calculations may not be shared. Usually, the search range for subsequent refinement steps may be small (e.g., typically 3×3 pels). Therefore, a cost of implementing the subsequent refinement steps separately is generally acceptable.

Figure 4:
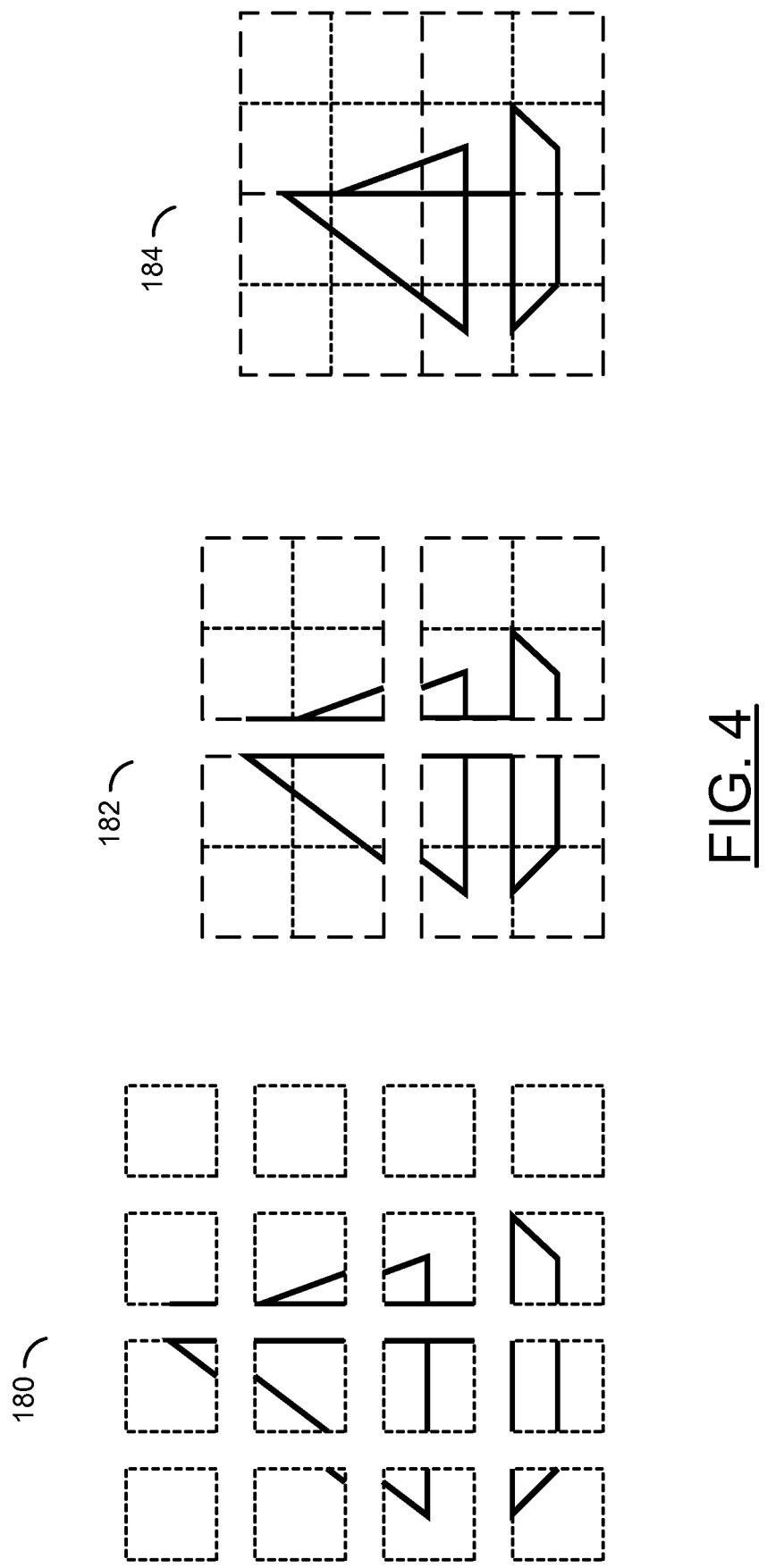
FIG. 4 is a diagram of a hierarchical cost metric combination.

Referring to FIG. 4, a diagram of an example hierarchical cost metric combination is shown. In various embodiments, the cost metric combination may be implemented in hardware logic. Consider an example, where only three coding unit sizes may be considered (e.g., 32×32, 16×16 and 8×8) and no further partitioning of the coding units into prediction units is used (so the prediction units may be identical to the coding units). Several (e.g., three) hierarchical refinement steps (e.g., the step P0, the step P1 and the step P2) may be performed to refine the motion estimation starting from a single coarse motion vector for the 32×32 block down to a quarter pixel resolution.

The hierarchical calculations of the cost metrics for the different coding units/prediction units at the initial step P0 are generally illustrated as sixteen 8×8 blocks (reference number 180). The cost metrics may be calculated for each 8×8 block (e.g., the smallest coding unit/prediction unit size) and each search position. The resulting cost metrics may be summed up in quads to produce the cost metrics of the four 16×16 coding units (e.g., the reference number 182). Finally the resulting four cost metrics may be summed up again to find the cost metrics of the entire 32×32 block (e.g., the reference number 184) for each search position.

Figure 5:
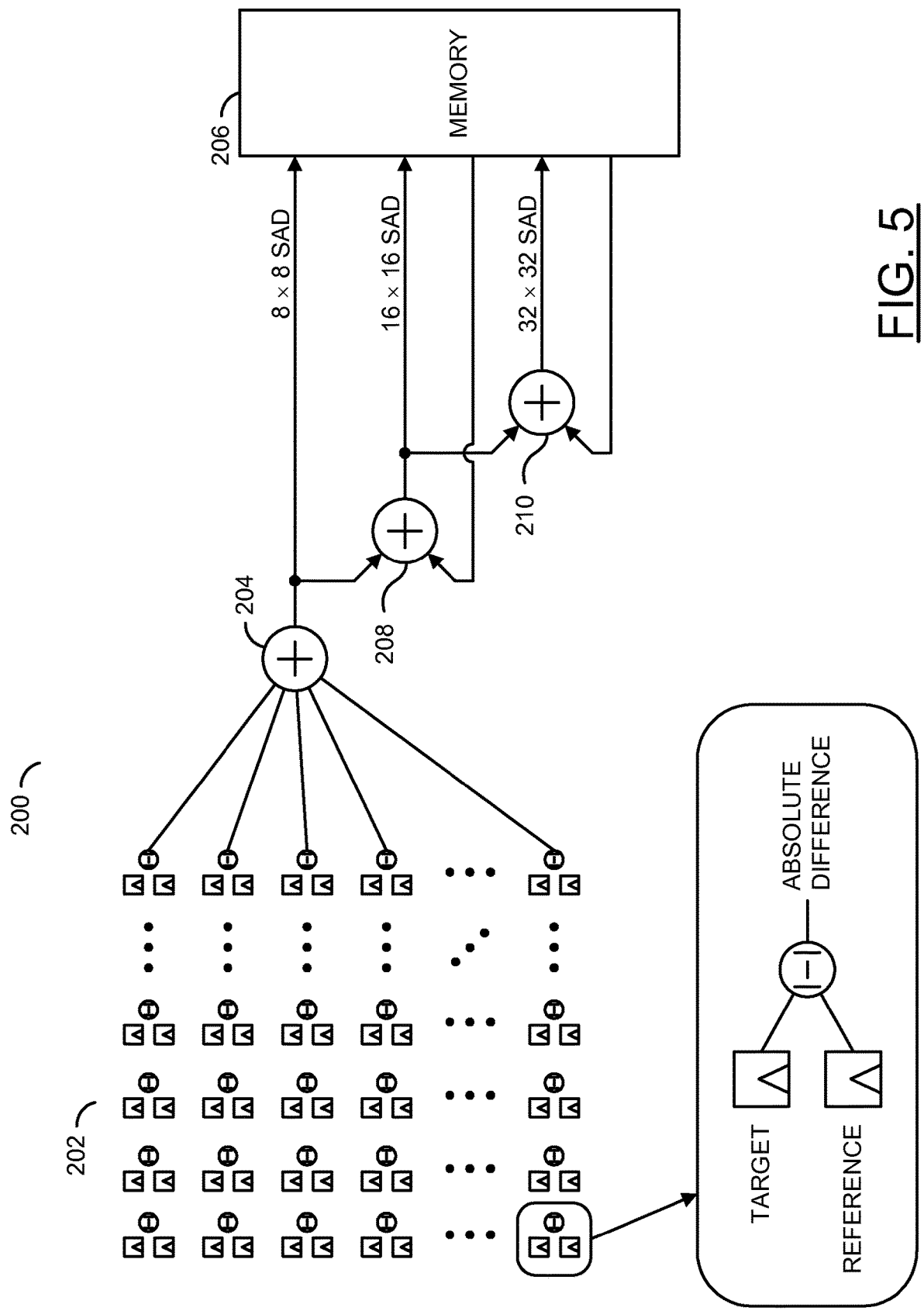
FIG. 5 is a block diagram of cost metric calculations in accordance with a preferred embodiment of the present invention.

Referring to FIG. 5, a block diagram of an example implementation of a circuit 200 that calculates the cost metrics for different sizes is shown in accordance with a preferred embodiment of the present invention. The circuit 200 generally comprises multiple blocks (or circuits) 202, a block (or circuit) 204, a block (or circuit) 206, a block (or circuit) 208 and a block (or circuit) 210. The circuits 202-210 may be implemented in hardware, software, firmware or any combination thereof in an apparatus (or circuit or device).

The circuit 200 generally iterates over all sixteen 8×8 blocks of the example in a Z-scan order. For each 8×8 block, target samples and reference samples may be loaded into an array of buffers/comparators in the circuits 202. Each pair of buffers at each node of the array may store a respective target sample and a respective reference sample. Each comparator at each node of the array may calculate an absolute difference value between the respective target sample and the respective reference sample. The circuit 204 may sum all of the absolute difference values to generate a cost metric (e.g., an 8×8 size SAD value) at the current search position.

The circuit 200 generally iterates over all (e.g., $(2n+1)^2$) possible search positions, where n defines a search range (e.g., 3×3, 5×5, 7×7, etc.). For each current search position, the reference samples corresponding to the current search position may be loaded into the array of the circuits 202. In a single step, the absolute difference values for all target/reference sample pairs of the 8×8 block may be calculated by the circuits 202 and summed by the circuit 204. The resulting 8×8 size SAD (cost metric) value may be stored into the memory circuit 206. As the circuit 200 iterates over the 8×8 blocks in Z-scan order and calculates the various 8×8 size SAD values, the 8×8 size SAD values may be accumulated by the circuit 208 in quads to produce the 16×16 size SAD values and stored in the memory circuit 206. The 16×16 size SAD values may be accumulated by the circuit 210 in quads to produce a 32×32 size SAD value and stored in the memory circuit 206.

Once the SAD values have been calculated, the motion vector differences and scores are generally calculated for each coding unit/prediction unit at each search position. A best motion vector may be selected for each coding unit/prediction unit separately. The final two steps (e.g., the step P1 and the step P2) of the hierarchical motion estimation (e.g., half pixel and quarter pixel refinement) may be performed separately for each coding unit/prediction unit in a fashion similar to the original process of hierarchical motion vector refinement.

Figure 6:
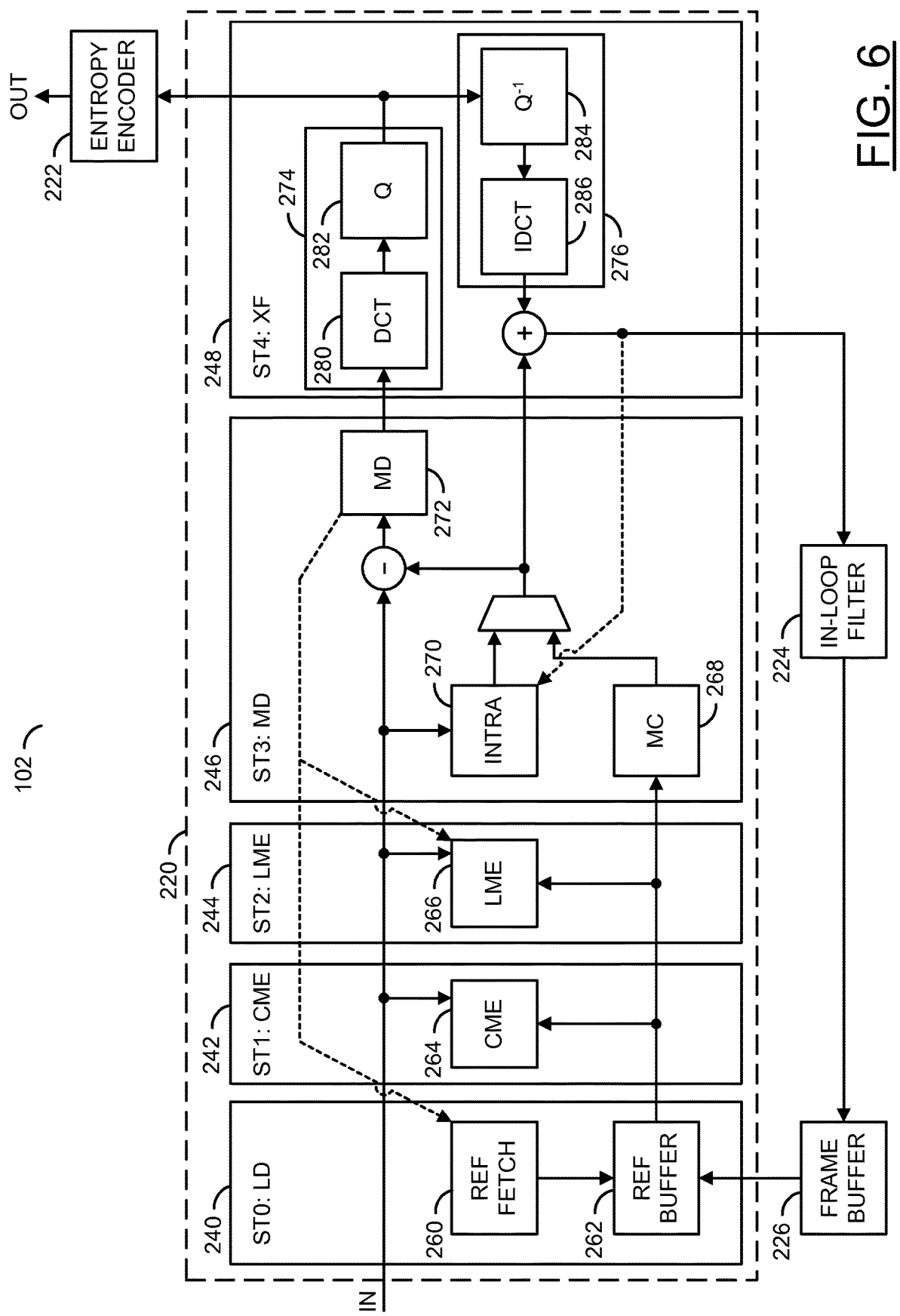
FIG. 6 is a detailed block diagram of a multiple-stage pipeline processor.

Referring to FIG. 6, a detailed block diagram of the circuit 102 with an example implementation of a five-stage pipeline 220 is shown. The circuit 102 generally comprises a block (or circuit) 220, a block (or circuit) 222, a block (or circuit) 224 and a block (or circuit) 226. The circuits 220-226 may be implemented in hardware, software, firmware or any combination thereof in an apparatus (or circuit or device). The circuit 220 may comprise a stage (or block) 240, a stage (or block) 242, a stage (or block) 244, a stage (or block) 246 and a stage (or block) 248. Other numbers of stages may be implemented by other embodiments to meet the design criteria of a particular implementation.

The circuit 220 is shown implementing a pipeline circuit. The circuit 220 is generally operational to generate coefficients by compressing the images received in the signal IN. In some embodiments of the invention, the circuit 220 may implement a multistage (e.g., 5-stage) hardware pipeline used to process the coding units and/or processing unit. The stages may include, but are not limited to, a load stage (e.g., ST0: LD), a CTU-level motion estimation stage (e.g., ST1: CME), a local motion estimation stage (e.g., ST2: LME), a mode decision stage (e.g., ST3: MD), and/or a transform stage (e.g., ST4: XF).

The load stage 240 generally performs reference image fetching 260 and stores the samples in a local reference buffer 262. The CTU-level motion estimation stage 242 may perform motion estimations (e.g., calculate cost metrics) for the small blocks of the coding tree unit. The local motion estimation stage 244 may perform motion estimation refinement for inter-prediction candidates. The mode decision stage 246 generally performs inter sample prediction and intra sample prediction and subsequently selects a coding mode. The transform stage 248 may provide a forward path to feed into an entropy coding unit, and an inverse path to produce neighboring sample data that are fed into an in-loop filter unit.

The circuit 222 is shown implementing an entropy encoder. In some embodiments, the entropy encoding technique may be a context-adaptive binary arithmetic coding technique. Other entropy coding techniques may be implemented to meet the criteria of a particular application.

The circuit 224 is shown implementing an in-loop filter. The circuit 224 is generally operational to filter reconstructed blocks created by the circuit 220 to smooth rough edges. The filtered blocks may be presented to the circuit 226.

The circuit 226 is shown implementing a frame buffer circuit. The circuit 226 may be operational to buffer reference frames (or fields, or images or pictures). The reconstructed reference frames may be used by the circuit 220 to compress additional images received in the signal IN.

The stage 240 is shown implementing a load stage. The stage 240 generally comprises a reference fetch unit 260 and a reference buffer (or memory) 262. The reference fetch unit 260 may be configured to fetch only a portion of a full reference frame used by the circuit 220. The buffer 262 may be configured to allow fast access to fetched reference samples (e.g., luminance samples) by the other stages of the circuit 220.

The stage 242 is shown implementing a CTU-level motion estimation stage. The stage 242 generally comprises a motion estimation unit 264. The motion estimation unit 264 may be operational to generate the initial cost metric values between a current block being compressed and a reference image buffered in the circuit 226. The initial cost values may be based on the initial coarse motion vector. The initial cost values may be calculated for each smallest intended coding unit/prediction unit in parallel, and summed for larger units. The cost metric values for the larger units may be summed for even larger units, and so on, until a cost metric value of the coding tree unit is calculated. From the cost metrics, motion vectors for each unit at each level of the coding tree unit may be determined.

The stage 244 is shown implementing a local motion estimation stage. The stage 244 generally comprises a local motion estimation unit 266. The local motion estimation unit 266 may be operational to refine the motion estimations for the current block being compressed and a reference image buffered in the circuit 226.

The stage 246 is shown implementing a mode decision stage. The stage 246 generally comprises an inter prediction sample generation (or motion compensation) unit 268, an intra prediction unit 270, and a candidate selection (or mode decision) unit 272. The stage 246 may be operational to determine modes (e.g., intra mode or inter mode and coding units/prediction units) for compressing the current samples.

The stage 248 is shown implementing a transform stage. The stage 248 generally comprises a forward path unit 274 and an inverse path unit 276. In various embodiments, the forward path unit 274 comprises a transform unit 280 and a quantization unit 282. In various embodiments, the inverse path unit 276 comprises an inverse quantization unit 284 and an inverse transform unit 286. The inverse quantization unit 284 is generally configured to perform an inverse operation relative to the quantization unit 282. The inverse transform unit 286 is generally configured to perform an inverse operation relative to the transform unit 280. The operations performed by the individual hardware units implemented in each stage of the circuit 220 generally implement the compression steps typical of the particular compression scheme(s) to be performed. The stages of the circuit 220 (e.g., stages 240-248) may comprise additional circuitry for operatively coupling the stages to one another. Feedback paths between the stages 240-248 (e.g., represented by dashed arrows) generally facilitate the communication of predictor information that is generally based on actual neighbor data rather than based on estimated neighbor data from later stages to earlier stages of the circuit 220.

Figure 7:
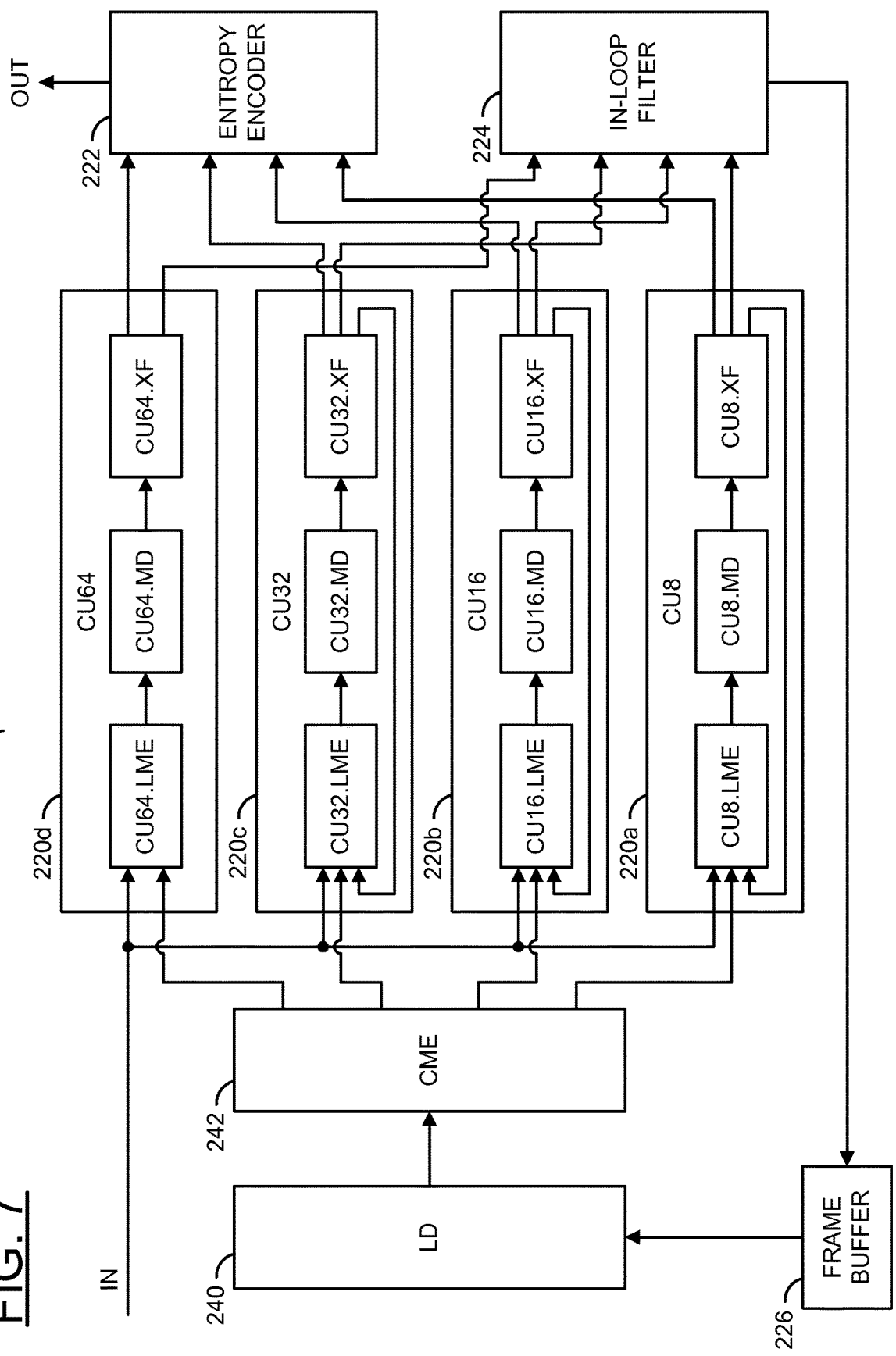
FIG. 7 is a detailed block diagram of a multiple pipeline processor.

Referring to FIG. 7, a detailed block diagram of an example implementation of the circuit 102 with multiple pipelines is shown. The figure generally illustrates a portion of the circuit 102 that may process all coding unit/prediction unit sizes in a quad-tree partitioning (e.g., K=4) of a 64×64 coding tree unit. The circuit 102 may comprise multiple (e.g., four) pipelines 220a-220d that may be used to process four coding unit sizes (e.g., CU8, CU16, CU32 and CU64) in parallel. The prediction units within a coding unit may be processed in a time-interleaved fashion within each of the four coding unit pipelines 220a-220d.

All pipelines 220a-220d may share common stages. In particular, the load (e.g., LD) stage 240 and the CTU-level motion estimation (e.g., CME) stage 242 may be shared among the parallel pipelines. The remaining three stages 244-248 may be implemented separately for each coding unit size.

The nonshared portions of the pipelines 220a-220c (e.g., process CU32, CU16 and CU8 blocks) operate at respectively 4 times, 16 times and 64 times the rate of the CU64 pipeline 220d. The pipelines 220a-220d generally operate in parallel, such that a single 64×64 block, four 32×32 blocks, sixteen 16×16 blocks and sixty-four 8×8 blocks may be processed in the same amount of time. The pipelines 220a-220d are generally coupled at the different levels of a quad-tree partitioning where a size decision is made, and the subsequent blocks in all pipelines consider the intermediate selections for subsequent decisions.

The pipelines 220a-220d generally operate in tile-interleaved fashion. At any time, up to three active tiles may be processed in the LME stages 244, the MD stages 246 and the XF stages 248 of the four pipelines 220a-220d, while a fourth tile may be processed in the shared CME stage 242, and a fifth tile may be loaded in the shared LD stage 240.

The frame buffer 226 may buffer the reconstructed frames for previously encoded pictures in a sequence that may be used as reference frames in cases of inter prediction. The coefficients of the selected coding unit (e.g., produced by one of the four pipelines 220a-220d) may be encoded with the entropy encoder circuit 222 to produce a final bitstream in the signal OUT. The reconstructed samples of the selected coding unit (produced by the same pipeline) may be filtered by the in-loop filter circuit 224 before the samples are written back to the frame buffer circuit 226.

For a coding tree unit of size 64×64, with all possible coding unit sizes down to 8×8, and standard HEVC prediction unit sizes including the smallest prediction unit sizes of 8×4 and 4×8, a multitude of prediction unit sizes generally exist for the motion estimation to consider. The initial refinement at an integer resolution (e.g., the step P0) may be performed separately for each coding unit/prediction unit with a search range of ±n in an X-direction and a Y-direction in the LME stages 244. Because a center point of each search is the same for all prediction units, the cost metric (e.g., SAD) value calculations may be done in the shared hierarchical fashion in the CME stage 242. Initially, the cost metric values may be calculated for a lowest common block of size 4×4. The cost metrics for larger prediction units may be calculated as the spatial sum of the cost metrics of the 4×4 units contained in the larger prediction unit. The summation may continue in hierarchical fashion. Therefore, obtaining the cost metric values for all prediction units is generally as efficient as calculating a single cost metric value of the entire 64×64 coding tree unit.

The motion vector difference calculation for each coding unit/prediction unit (e.g., CU8, CU16, CU32 and CU64) may be done separately in the respective LME stages 244. A motion vector difference is defined as the motion vector at the search point minus a motion vector predictor (e.g., MVP), and hence the latter is potentially different for each prediction unit. The refinement down to a half pixel (e.g., the step P1) resolution with search range of ±0.5 and a quarter pixel (e.g., the step P2) resolution with search range of ±0.25 may be done in the separate local motion estimation stages 244.

Each pipeline 220a-220d may perform a separate motion decision in the MD stages 246. The selected modes may be used to transform the winning coding units/prediction units separately in the XF stages 248. The resulting coefficients of the winning units are generally entropy encoded in the circuit 222. The XF stages 248 may also inverse transform the coefficients and present reconstructed samples to the circuit 224. The circuit 224 generally filters the reconstructed samples. The filtered samples may be stored in the circuit 226 and used as reference samples to encode other frames.

Various embodiments of the invention generally provide efficient motion estimation for high performance, high quality tree-coded video compression according to more recent video compression standards, including but not limited to the High-Efficiency Video Coding standard. The embodiments generally provide efficient motion estimation at multiple levels of granularity and/or unit (or block) sizes. The motion estimation information may be used as input data to motion compensations, compressions, computer vision and/or optical flows. The computer vision and/or optical flows may utilize the motion estimation information to perform motion detection, motion tracking, identification and/or segmentation. Sharing the initial steps of a hierarchical motion estimation may allow area reduction of a hardware implementation. At the step where the hierarchical motion estimation switches from a shared global search to a separate local search, the cost metric value calculations (generally a most costly part of motion estimation) may be performed in a shared hierarchical fashion. Therefore, an area savings may be realized. Possible reduction in an encoding quality due to the shared global initial steps may be avoided by applying a larger search grid at the initial local hierarchical search step.

The functions and structures illustrated in the diagrams of FIGS. 1-7 may be designed, modeled and simulated using one or more of a conventional general purpose processor, digital computer, microprocessor, microcontroller and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example a non-transitory storage media, and may be executed by one or more of the processors. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the scope of the invention.

The invention claimed is:

1. An apparatus comprising:
a first circuit to (i) compare, at a first level of a motion estimation hierarchy, a plurality of first units of a coding tree unit of a current picture with samples of a reference picture to generate a plurality of first cost metrics that correspond to said first units in said coding tree unit of said current picture, and (ii) combine, at said first level of said motion estimation hierarchy, said first cost metrics to generate a plurality of second cost metrics that correspond to a plurality of second units in said coding tree unit, wherein said coding tree unit is divided using K-tree partitioning into variable size coding units, each of said second units corresponds to one of the variable size coding units and comprises one or more of said first units, and each of the plurality of second cost metrics corresponds to a respective second unit of the plurality of second units and is generated by combining the first cost metrics corresponding to the first units comprising each of said second units; and
a second circuit comprising a plurality of pipelines, each of said pipelines pipeline performs one or more subsequent refinement steps for a respective coding unit size of coding units of said coding tree unit of said current picture using cost metrics received from said first circuit, and each of said pipeline having at least (i) a first stage to generate motion vector differences and scores for at least a second level of said motion estimation hierarchy, (ii) a second stage to select between an intra mode of compression and an inter mode of compression for each coding unit of said respective coding unit size, and (iii) a third stage to perform quantization, transformation, inverse quantization, and inverse transformation operations, wherein all of said pipelines operate in parallel with each other and each of the pipelines operates at a different speed that corresponds to the respective coding unit size, such that each of the pipelines processes all the respective second units of the coding tree unit of the respective coding unit size in the same amount of time.

2. The apparatus according to claim 1, wherein (i) said first cost metrics are generated based on an initial motion vector shared by all of said first units.

3. The apparatus according to claim 1, wherein said first units comprise one or more of (a) a plurality of prediction units and (b) a plurality of coding units.

4. The apparatus according to claim 1, wherein each of said pipelines further comprises a fourth stage to motion compensate portions of said reference picture based on motion vectors generated within said pipeline.

5. The apparatus according to claim 1, wherein said pipelines are part of a digital camera that generates a compressed video signal.

6. The apparatus according to claim 5, wherein said compressed video signal is compliant with International Telecommunication Union-Telecommunications Standard H.265.

7. A method for shared motion estimation cost metrics for coding tree units of a picture, comprising the steps of:
   comparing, at a first level of a motion estimation hierarchy using a first circuit, a plurality of first units of a coding tree unit of a current picture with samples of a reference picture to generate a plurality of first cost metrics that correspond to said first units in said coding tree unit of said current picture;
   combining, at said first level of said motion estimation hierarchy using said first circuit, said first cost metrics to generate a plurality of second cost metrics that correspond to a plurality of second units in said coding tree unit, wherein said coding tree unit is divided using K-tree partitioning into variable size coding units, each of said second units corresponds to one of the variable size coding units and comprises one or more of said first units, and each of the plurality of second cost metrics corresponds to a respective second unit of the plurality of second units and is generated by combining the first cost metrics corresponding to the first units comprising each of said second units;
   generating a plurality of motion vectors using a second circuit comprising a plurality of pipelines, wherein each of said pipelines performs one or more subsequent refinement steps for a respective coding unit size of coding units of said coding tree unit of said current picture using cost metrics received from said first circuit, and each of said pipelines has at least (i) a first stage to generate motion vector differences and scores for at least a second level of said motion estimation hierarchy, (ii) a second stage to select between an intra mode of compression and an inter mode of compression for each coding unit of said respective coding unit size, and (iii) a third stage to perform quantization, transformation, inverse quantization, and inverse transformation operations, wherein all of said pipelines operate in parallel with each other and each of said pipelines operates at a different speed that corresponds to the respective coding unit size, such that each of said pipelines processes all the respective second units of the coding tree unit of the respective coding unit size in the same amount of time; and
   storing a reconstructed representation of said current picture in a memory.

8. The method according to claim 7, wherein said first cost metrics are generated based on an initial motion vector shared by all of said first units.

9. The method according to claim 7, wherein said first units comprise one or more of (a) a plurality of prediction units and (b) a plurality of coding units.

10. The method according to claim 7, further comprising the step of:
   motion compensating portions of said reference picture within each of said pipelines.

11. The method according to claim 7, wherein said pipelines are part of a digital camera that generates a compressed video signal.

12. The apparatus according to claim 1, further comprising an entropy encoder circuit (i) coupled to said pipelines and (ii) configured to generate a bitstream representation of said current picture by encoding a plurality of coefficients selected from said pipelines.

13. The apparatus according to claim 1, wherein a third circuit is used to transfer portions of said reference picture to said first circuit.

14. The apparatus according to claim 1, wherein said pipelines operate with up to three tiles propagating through each of said pipelines at a time.

15. The method according to claim 7, further comprising the step of:
   generating a bitstream of said current picture by encoding a plurality of coefficients selected from said pipelines.

16. The method according to claim 7, further comprising the step of:
   transferring portions of said reference picture to said first circuit using a third circuit.

17. The method according to claim 7, further comprising the steps of:
   for each of said first units, loading target samples and reference samples into an array of buffers;
   simultaneously calculating an absolute difference value between each target sample and a respective reference sample in said array of buffers using a respective comparator circuit;
   summing all of the absolute difference values to generate a respective first cost metric; and
   accumulating one or more of the respective first cost metrics to produce the second cost metric for each of said second units.

18. The apparatus according to claim 1, further comprising:
   a plurality of buffers configured to store samples of said current picture and samples of said reference picture corresponding to a current first unit;
   a plurality of comparators coupled to the plurality of buffers and configured to calculate absolute difference values for each current picture sample and a corresponding reference picture sample;
   a first summing circuit coupled to the plurality of comparators to sum the absolute difference values to generate said first cost metric corresponding to said current first unit; and
   one or more additional summing circuits accumulating said first cost metrics to generate said second cost metrics.

* * * * *